UNITED STATES PATENT OFFICE.

SAMUEL CLELAND DAVIDSON, OF BELFAST, IRELAND.

PROCESS OF CLARIFYING TEA.

SPECIFICATION forming part of Letters Patent No. 352,809, dated November 16, 1886.

Application filed February 25, 1886. Serial No. 193,211. (No specimens.)

*To all whom it may concern:*

Be it known that I, SAMUEL CLELAND DAVIDSON, of Belfast, Ireland, have invented certain new and useful Improvements in the Clarification of Aqueous Infusions or Decoctions of Tea, of which the following is a specification.

When aqueous infusions or decoctions of tea as ordinarily prepared become cold, they are usually very turbid and objectionable-looking as beverages, and in this state are also very prone to decomposition if kept for even a few days. This turbid precipitation is due to the chemical reaction in cooling of the constituent ingredients of the infusion upon one another, and any process of clarification which involves the removal of these precipitated matters necessarily involves an equivalent loss of the very ingredients which give strength and quality to the liquor.

My hereinafter-described improvements in the clarification of such infusions have the great advantage of not involving the removal of this precipitated matter, their principle of operation being to dissolve it and hold the constituent ingredients of the infusion in permanent solution, and so retain in it all its characteristic tea properties, together with the rich color and attractive brilliancy of the hot infusion.

My improvements are carried out as follows: I make an infusion or decoction of tea with boiling water, and of preferably three or four times the strength that such infusions are ordinarily used as beverages, and strain it free from the tea-leaves and sediment. The liquor at this stage and while hot is brilliantly transparent, but on cooling it gets very opaque or turbid, owing to the formation of the precipitate hereinbefore described. To this opaque-looking liquor I now add borax (biborate of soda) in sufficient quantity to dissolve the precipitated matter, about two grains of borax to each ounce of infusion being generally sufficient to thoroughly clarify the liquor, which it at the same time renders slightly alkaline to test-paper. It also makes it richer in color and capable of being kept a long time in good condition if bottled carefully, so as to exclude air, or it may be mixed with carbonated water and bottled to form aerated beverages. When required for this latter purpose, the borax treatment alone is not, however, sufficient to prevent a slight reprecipitation forming again under the action of the carbonic acid of the carbonated water, and to prevent this result I treat the hot infusion with trihydrate of alumina prior to its treatment with borax. For this purpose the trihydrate of alumina which I preferably employ is that described in my Patent No. 243,521—viz., that prepared by precipitation from alum, the precipitate being well washed and filtered and then mixed with water into a paste of cream-like consistency. Of this alumina paste I use about one gallon to every twenty gallons of infusion, and after stirring it well into the hot infusion I filter it out again by passing the infusion through bag or other suitable filters. The alumina combines with and carries out with it the matter which the carbonic acid would subsequently precipitate, and I preferably filter out the alumina while the infusion is still hot. The filtered infusion in cooling will become almost as turbid as if it had not been subjected to the alumina treatment, but the addition of borax to it now, as in the first-described process, completely dissolves this turbidity and thoroughly clarifies the liquor, and the infusion as now prepared will bear admixture with carbonated water without any precipitation reforming, and if carefully bottled will remain in good condition a long time and form an agreeable drink having the flavor, color, and characteristic properties of tea combined with the attractive appearance of areated and sparkling beverages.

If the infusions or decoctions be required sweet, sugar may be added to the clarified liquors to whatever degree of sweetness may be desired; but the sugar used should be of the purest quality.

In the preparation of the infusions the water which I preferably use is what is known as "soft" water—that is, water free from the "hardness" of sulphate of lime in solution.

I am aware that borax has long been known and used as a preservative for milk, meat, fish, &c.; but, so far as I am aware, it has never been used for effecting the clarification of the substances with which it is mixed. For eximple, its effect on milk has never been to clarify it. I make no claim to the use of borax as a preservative.

I am also aware that alum and borax have been used together for preserving meat, milk, &c.; but I do not use alum at all. It would not answer the purpose of my invention, as its effect on a decoction of tea is not to clarify it, but, on the contrary, to render it much more turbid. I use another compound of aluminium— viz., trihydrate of alumina, and this only when the decoction is to be mixed with carbonic acid or carbonated water.

I am also aware that alum and borax have been used conjointly for purifying river-water; but when so used the impurities of the water are precipitated not by the borax but by the action of the alum, and this action takes place if the alum be used alone and without the borax, whereas if the borax be used alone it does not clarify the water, and its employment along with the alum is not for the purpose of clarifying the water, but merely to modify the acrid taste of the alum in the water. As already observed, however, I do not use alum at all, for it will not clarify infusions or decoctions of tea, but, on the contrary, will make them much more turbid.

What I claim, and desire to secure by Letters Patent, is—

1. The herein-described method of clarifying aqueous infusions or decoctions of tea, so that they will remain clarified and brilliant when cold, which consists in dissolving the precipitated matter that causes the turbid appearance of said infusions or decoctions by adding borax to them until a faintly alkaline reaction is produced, whereby the liquor is clarified brilliantly, all substantially as set forth.

2. The herein-described method of clarifying aqueous infusions or decoctions of tea, so that they will remain clarified and brilliant when cold, and when charged with carbonic acid or mixed with carbonated water for the production of an effervescent beverage, which consists in first effecting the removal of the matter which the carbonic acid would precipitate by adding to said infusions or decoctions trihydrate of alumina in about the proportion specified, stirring or agitating the solution so that the alumina and said matter may combine, and then removing this combination by filtration or decantation, and next in dissolving the matter that causes the turbid appearance of said infusions or decoctions, owing to its precipitation on their becoming cold, by adding borax to them until a faintly alkaline reaction is produced, whereby the liquor is clarified brilliantly, all substantially as set forth.

In witness whereof I have hereunto signed my name in the presence of two subscribing witnesses.

SAMUEL CLELAND DAVIDSON.

Witnesses:
 FRANCIS A. MAITLAND,
  *Librarian, Linen Hall, Belfast.*
 CHARLES WEST
  *Porter, Linen Hall, Belfast.*